United States Patent [19]

Ackeret

[11] Patent Number: 5,048,209
[45] Date of Patent: Sep. 17, 1991

[54] APPARATUS FOR CYCLIC REARRANGEMENT OF A SHEET STACK

[75] Inventor: Peter Ackeret, Kusnacht, Switzerland

[73] Assignees: Licinvest AG, Chur, Switzerland

[21] Appl. No.: 444,137

[22] PCT Filed: Apr. 4, 1989

[86] PCT No.: PCT/EP89/00363
§ 371 Date: Nov. 30, 1989
§ 102(e) Date: Nov. 30, 1989

[87] PCT Pub. No.: WO89/09947

[30] Foreign Application Priority Data

Apr. 8, 1988 [DE] Fed. Rep. of Germany ....... 3811750

[51] Int. Cl.[5] .......................................... G09F 11/30
[52] U.S. Cl. ..................................... 40/511; 40/513
[58] Field of Search .......................... 40/511, 513, 490

[56] References Cited

U.S. PATENT DOCUMENTS 4,241,528 12/1988 Ackeret ................................. 40/513
4,759,142 7/1988 Ackeret ................................. 40/513

FOREIGN PATENT DOCUMENTS 3014394 10/1981 Fed. Rep. of Germany .
2005637 4/1979 United Kingdom .

Primary Examiner—Peter R. Brown
Assistant Examiner—J. Hakomaki
Attorney, Agent, or Firm—Robert R. Jackson

[57] ABSTRACT

An apparatus for cyclic rearrangement of a stack of sheets includes a transfer system for an individual sheet so as to displace it from one stack end to the other stack end. The transfer system includes at least one pivotable element, namely a bent wire element subjected to spring bias which, in turn is produced by the wire element itself due to its being deformed upon assembly.

40 Claims, 6 Drawing Sheets

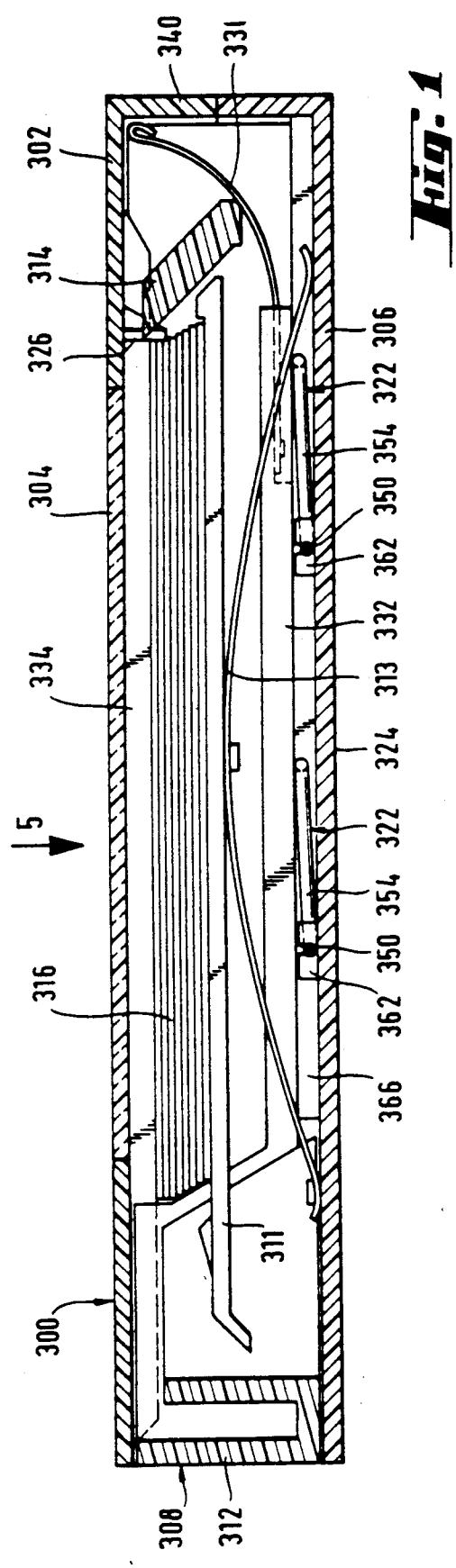
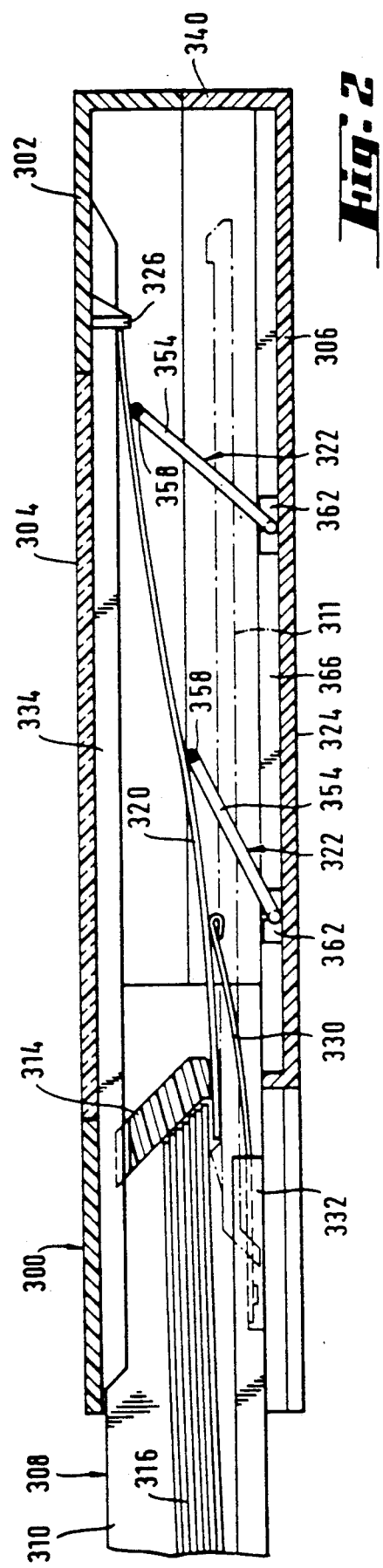

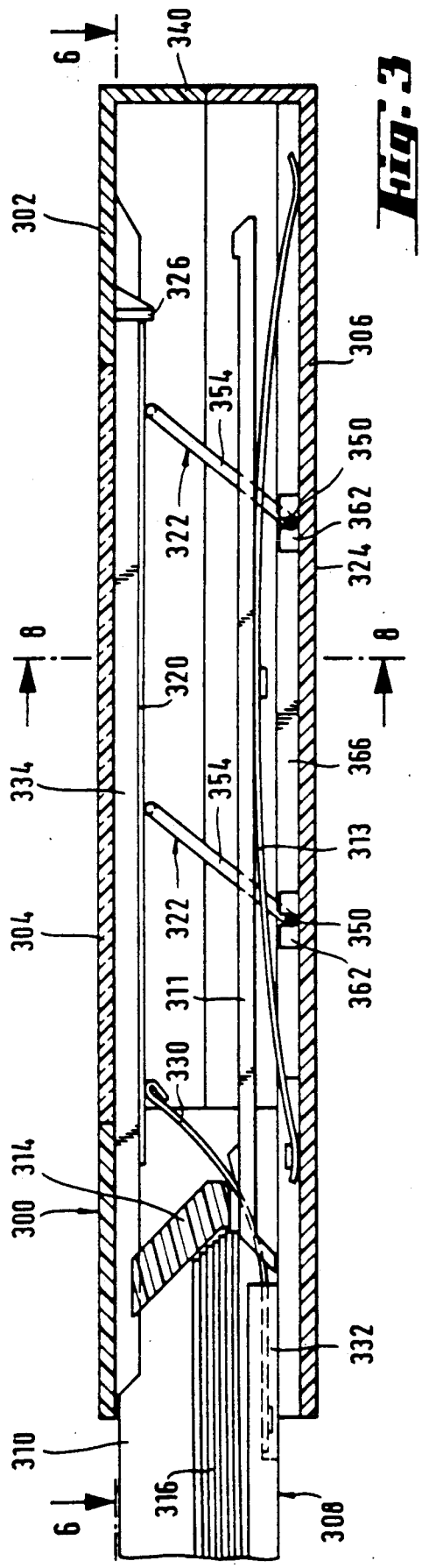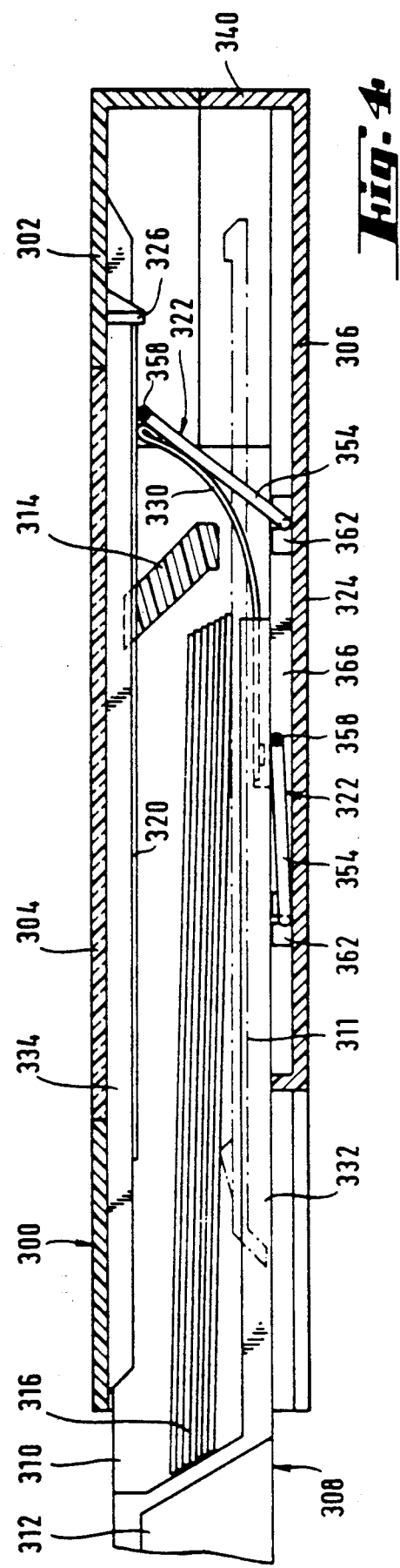

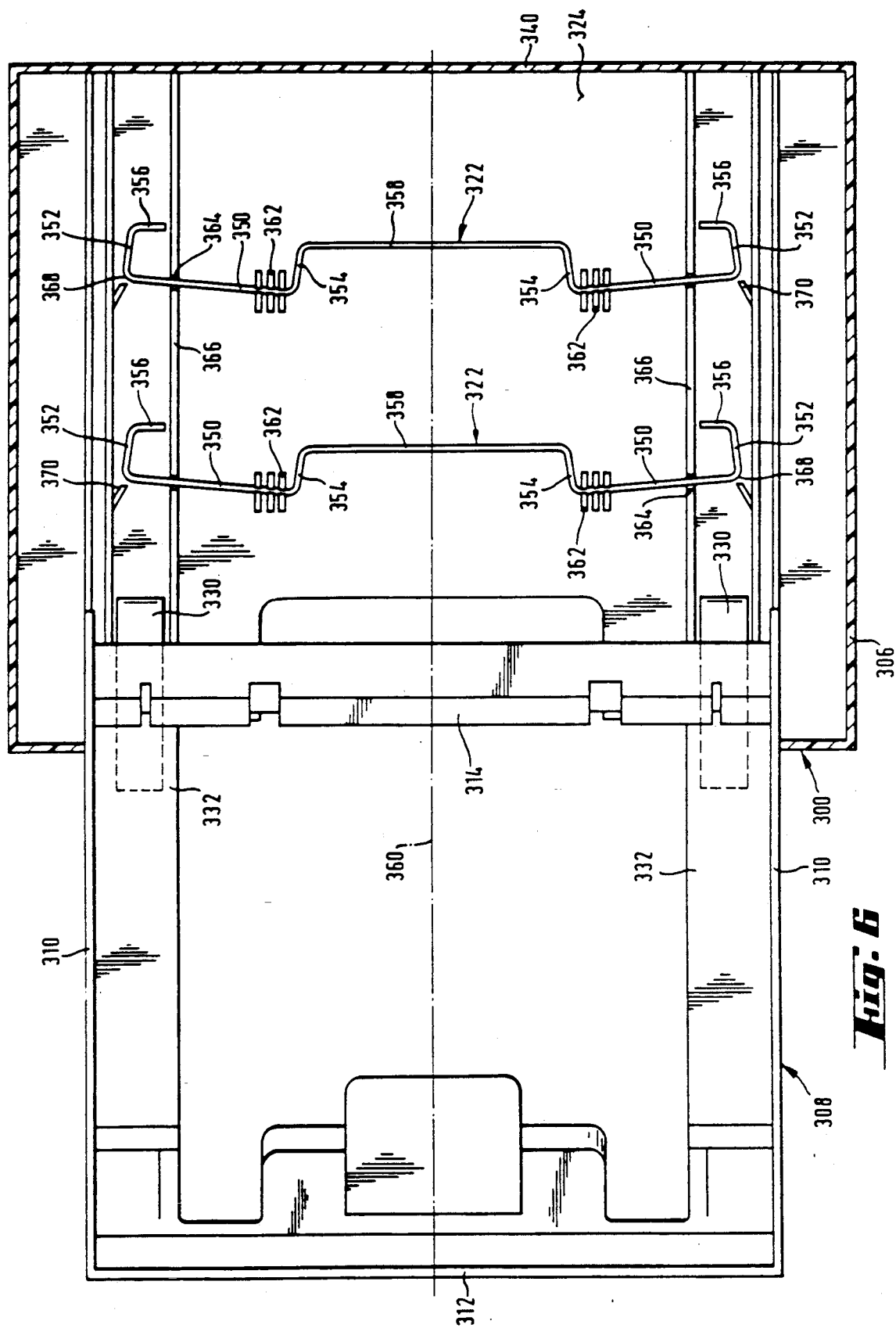

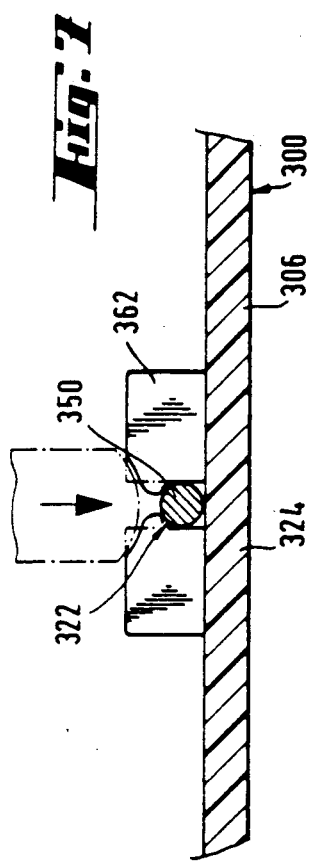
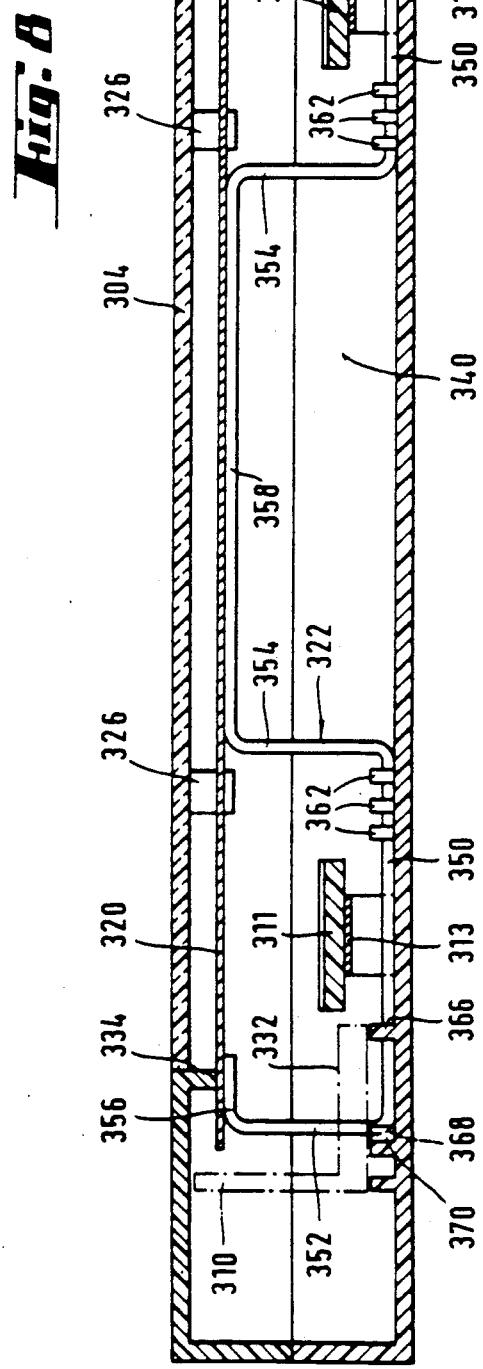

APPARATUS FOR CYCLIC REARRANGEMENT OF A SHEET STACK

The present invention relates to an apparatus for cyclic rearrangement of a stack of substantially rectangular sheets of nominally identical thickness, such sheets being e.g. photographic prints.

An apparatus of this type is disclosed in non-published German Patent Application P 37 39 500 in very detail, and the disclosure thereof is included herein by reference. The apparatus comprises a first frame member, i.e. a housing having a display window, and a second frame member, i.e. a slider which is slideably reciprocable out of and into the housing. A stack of sheets is disposed beneath the display window and is urged toward the window by two rails mounted on bias springs in the housing. Upon withdrawal of the slider from the housing, a separator bar which forms an inner end wall of the slider carries away the sheets of the stack except an individual sheet in contact with the rails, that is the one sheet which was remote from the window with the slider in the housing. This one individual sheet remains in the housing. Once the slider is withdrawn, the spring bias of the rails is deactivated. The individual sheet so removed from the remainder of the stack is now to be transferred to the other end of the stack adjacent the window. For this purpose, the apparatus includes a transfer system. According to the prior patent application mentioned above, this transfer system comprises a set of leaf springs which lift the individual sheet towards the window and holds it in front of stops engaged by a transverse sheet edge. The opposite transverse edge of the sheet passes through a return gap upon the slider being pushed back into the housing, this return gap being defined by the separator bar and a housing wall. During the inward stroke of the slider, the individual sheet must be safely supported by the stops irrespective of arching of the sheet about whatever axis. Such deformations of photo prints, e.g., occur due to varying air humidity. Further, the sheet edge adjacent the separator bar must be kept in substantial alignment with the return gap in spite of such arching in order to prevent damaging of the sheet. The risk of damaging exists over at least the first portin of the slider return stroke as the sheet cannot pass the gap without friction. In other words, the transfer system has to attribute to the "stiffening" of the individual sheet.

Numerous different designs of sheet transfer systems are disclosed in WO 86/03019 including systems in which the individual sheet is supported not only adjacent its ends but also near its center.

An apparatus of the type in question should be adapted to mass production so as to replace an album or/and a strut frame. Accordingly, its components should be manufactured and assembled at minimum expenses. Further, it is desireable that the apparatus may be operated with low friction and without production of excessive noise.

It is therefore an obJect of the present invention to improve the apparatus of the type in question so that it may be manufactured at low costs and its operation is convenient.

The independent claims define three aspects of the present invention while the respective subclaims define preferred details of the concept.

The invention provides a transfer system including at least one and preferably two or even more pivotable elements produced by bending a length of wire. Upon assembly, the wire member is deformed such that it produces itself a spring bias sufficient to transfer an individual sheet. Such bent were members are quite cheap and may be handled automatically in an assembly shop. With a circular section shape, bearings for the pivoting motion do not present a problem. The pivotable element may be controlled by spring arms mounted on the slider and adapted to form themselves a secondary transfer system. Thanks to these spring arms, a direct collision between the pivotable member and rigid portions of the slider are avoided which, otherwise, could lead to sudden friction increase and noise upon the slider being pushed home.

A preferred embodiment of the invention is illustrated in the attached drawings and will be described in detail hereunder.

FIG. 1 is a longitudinal section view of the apparatus in its rest position,

FIG. 2 shows in analog manner a partially withdrawn position,

FIG. 3 shows in analog manner the outer end position,

FIG. 4 shows in analog manner a partially pushed-in position,

Figure 5:
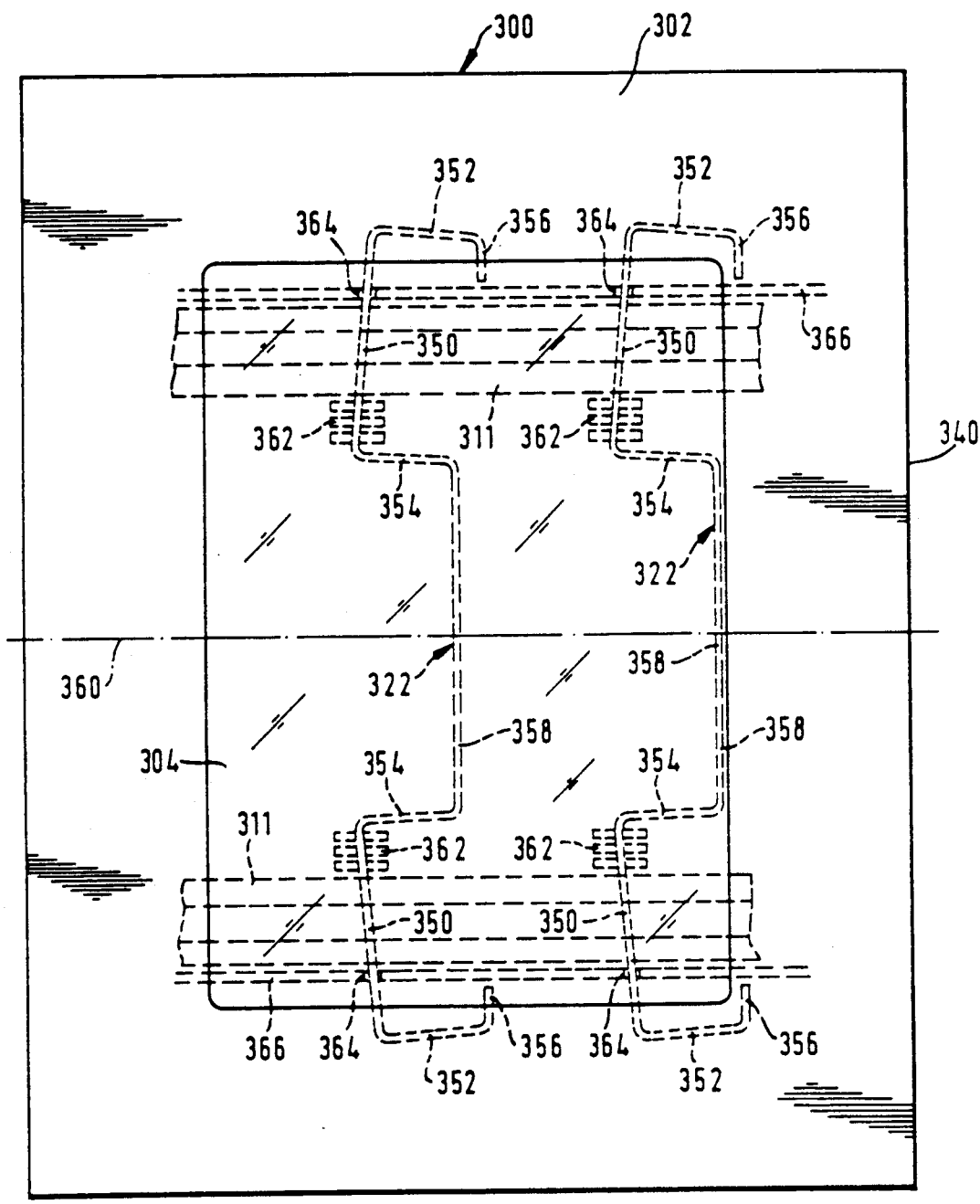
Figure 9:
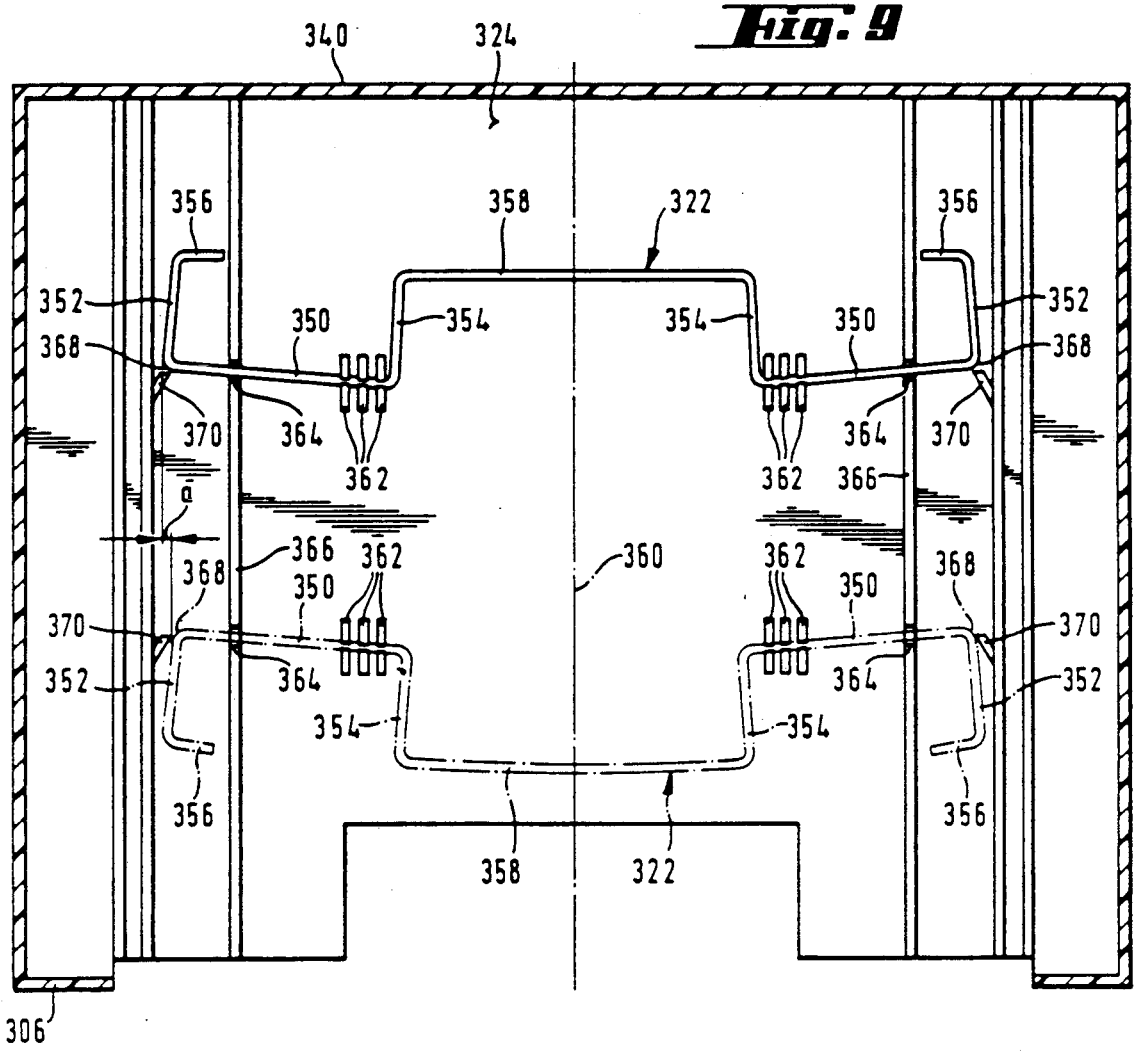
Figure 10:
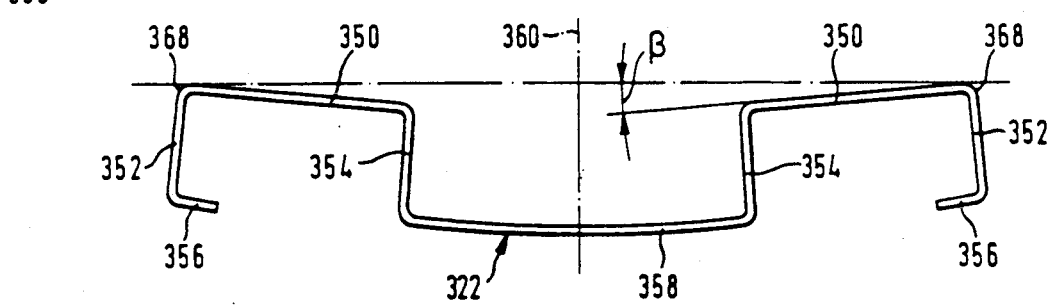

FIG. 5 is a partial plan view of the closed, empty apparatus seen in direction of arrow "5" in FIG. 1, FIG. 6 is a partial section view of an empty open apparatus in the section plane 6—6 of FIG. 3, FIG. 7 illustrates a detail of an assembly process, FIG. 8 is a section view according to plane 8—8 of FIG. 3, FIG. 9 is a plan view of the bottom shell of the housing for the purpose to explain an assembly process, FIG. 10 illustrates a wire spring prior to its being mounted in plan view.

It is to be kept in mind that certain components indispensable for the operation of the apparatus are not illustrated in the drawings in order to emphasize the particularities of the invention. Such non-illustrated components, however, are disclosed in the earlier patent applications referred to above the disclosure of which is included herein by reference. For example, the spring-supported rails which urge a sheet stack against the display window when the apparatus is in its rest position may be seen in FIG. 1, 3, 5, and 8 only.

The apparatus comprises a housing 300 including a top shell 302 and a bottom shell 306. A display window is inserted into the top shell and designated 304. A slider 308 is slideably moveable in housing 300 between an inner end position (FIG. 1) and an outer end position (FIG. 3). The slider comprises two longitudinal bars 310 interconnected, adjacent the outer slider end, by a front portion 312 and, adjacent an inner slider end, by a separator bar 314. Passage gaps for just one sheet are provided between the separator bar and the housing. When the slider is in its outer end position, a stack of sheets 316 is supported by the longitudinal slider bars 310. When the slider is in its inner end position, however, two longitudinal rails 311 each supported by a leaf spring 313 urge the stack towards the display window. Upon withdrawal of the slider from its inner towards its outer end position, the individual sheet remote from the display window remains in the housing while the slider transports the remaining sheets of the stack out of the housing. The said one individual sheet is to be transferred to the stack end adjacent the display window upon the slider being pushed back into the housing;

therefore, this one sheet is to be transferred from one passage gap to the other passage gap. Futher, this one sheet is to be supported adjacent its end remote from the return passage gap regardless of any curvature thereof.

For this purpose, the apparatus comprises three transfer systems. The first system includes a bent wire member 322 which is pivotable about an axis located adjacent bottom 324 of bottom shell 306 and has a plurality of crank-like ellbow bends. It is spring-biased such that the bent lever arms thereof are pivoted toward the display window. Further, it is located in the housing such that the lever arms engage beneath the individual sheet in close proximity in front of stop members 326.

The second transfer system is identical with the first one but mounted in the housing closer to the opening thereof through which the slider reciprocates.

The third transfer system comprises two leaf springs 330 mounted on the longitudinal slider bars and extending underneath the separator bar 314. The free ends of leaf springs 330 are bent backwards so that they can slide along the individual sheet without upsetting.

In the rest or start position illustrated in FIG. 1, the two bent wire members 322—designated hereinafter as "brackets"—are pivoted against their spring bias and assume a position between bottom 324 of bottom shell 306 and skids 332 which are integrally formed with longitudinal slider bars 310 and carry the leaf springs 330, too. The sheet stack is urged by rails 311 in abutment with longitudinal ribs 334 integrally formed with top shell 302 at the inner face thereof; these ribs prevent direct contact between the display window and the sheet next to it. Upon start of the slider outward stroke or withdrawal, the oblique surface of the separator bar engages the adjacent transverse edges of the sheets in the stack so to push them away from the display window against bias produced by springs 313. After a predetermined stroke of the slider, the rail ends remote from the housing opening anchor themselves in the position remote from the window while the separator bar 314 depresses the other rail ends. In this manner, the pressure of the rails is de-activated. Simultaneously, however, the skids 332 release at first one, thereafter the second bracket 322, too; the brackets may assume their upright position only gradually because the individual sheet retained in the housing overlies them, and this sheet, in turn, is depressed by the separator bar which overruns the sheet. Only in the outer end position of the slider (FIG. 3) the individual sheet is released from the separator bar 314, and the leaf springs 330 may now lift the traverse end edge of the individual sheet adjacent the housing opening in front of the return gap. Simultaneously, the two brackets 322 support safely the individual sheet so that it cannot disengage from stop members 326.

It will be seen in FIG. 3 that the separator bar 314 and the ribs 334 interengage in a comb-like manner so that the individual sheet is slightly elastically deformed upon its passing through the return gap, and this involves necessarily some friction. The three transfer systems, however, prevent any crushing of the individual sheet upon the slider being pushed home from its outermost position to its innermost position. In particular, the third transfer system, i.e. leaf springs 330, is leading with respect to the separator bar so as to hold the engaged portion of the individual sheet in front of the return gap.

After a predetermined return stroke of the slider, these leaf springs 330 abut that bracket 322 which is disposed about in the middle of the housing, such that at first the free end of the leaf springs hit the free ends of the bends so that thanks to the long lever arm a small effort only is needed to pivot the bracket into its depressed position. As the leaf springs 330 are quite weak, they perform a rolling motion along the bracket bends until their force is sufficient. This prevents the generation of hit noise and assures a gradually increase of movement resistence. The inner bracket is depressed in a similar manner (FIG. 4). The leaf springs are mounted beneath ribs 334 which have a chamfered end adjacent the housing rear wall 340, and the leaf springs slide along these chamfered ends until they engage said rear wall once the slider has reached its inner end position (FIG. 1).

Referring now to FIG. 9 and 10, some particularities of brackets 322 and their mounting will be explained. FIG. 10 illustrates the shape to which a length of wire having round section shape is bent. It will be recognized that there are two straight shaft sections 350 from which each an outer lever arm 352 and an inner lever arm 354 extend under an angle of substantially 90°. The free ends of the outer lever arms, in turn, have extensions 356 extending to oneanother and under 90° with respect to the respective lever arm. The two inner lever arms 354 are connected by a slightly arched central portion 358 so that the two shaft portions 350 do not define a common straight axis but a double axis bent in the central plane of symmetry 360 under an angle $\beta$. Thus, each bracket has two "half" axes or shafts 350.

Bearings 362 are integrally formed with bottom 324 of bottom shell 306. It is to be noted that the housing shells, as well as the slider, are injection molded plastic parts, and this is true for the rails 311, too; in contrast, springs 313, 330 and brakkets 322 consist of metal. The shaft portions 350 are received in the bearings 362 and further in slots 364 provided in slider support ledges 366. The bearing axes so defined extend under angle $\beta$, too, so that the brackets may be inserted into the bearings and slots in the position indicated in FIG. 9 in dashed lines. Thereafter, the brackets are secured by deforming the bearings by cold or warm flux of the plastic material, and this is schematically indicated in FIG. 7.

The brackets so mounted, however, assume a "false" position, and therefore they are pivoted through about 180°. Geometrically, this is equivalent to a bending of the shaft portions about 2 times $\beta$ with the result that the central portion 358 is elastically deformed to become straightened, the entire bracket being lengthened in lateral direction. The bends 368 between the shaft portions 350 and the outer lever arms 352 pass thereby latches 370 integrally formed with the housing bottom shell, and these arms performing thereby a snapping action; the latches prevent thereafter a return of the brackets into their "false" position which otherwise would occur because of the spring bias produced by the elastic deformation of central bracket portion 358. These latches simplify the assembly process only because the brackets cannot spring back once the slider has been inserted into the bottom shell and the top shell is connected to the bottom shell. It may be seen in FIG. 5 and 8 that the rails 311 are disposed just on top of the shaft portions 350 of the brackets.

The effective spring bias of the brackets 322 may be varied by variation of angle $\beta$ until an optimum is reached thus that the brackets support the individual sheet safety but, simultaneously, do not exhibit to much resistance against dpression upon the slider being pushed home.

It is not compulsory that the bracket has a straight continuous central portion; the latter could, alternatively, have recesses or the like so as to provide space for accommodation of other components.

I claim:

1. An apparatus for cyclic rearrangement of a stack of substantially rectangular sheets of nominally identical thickness, comprising a first frame member and a second frame member, one of said frame members having a display window, said frame members being reciprocable relative to one another between an inner end position and an outer end position, and means for removing an individual sheet from a first end of an inserted sheet stack through a removal gap upon withdrawal of said frame members and for returning said removed individual sheet to the second stack end through a return gap upon the frame members being pushed together, said means including at least one transfer system for guiding said individual sheet from said removal gap to said return gap, said transfer system comprising at least one pivotable element mounted in said first frame member and engaging said individual sheet at its side facing away from said return gap, said pivotable element being subjected to spring bias and pivotable about an axis extending substantially transverse to the reciprocation direction, said transfer system further comprising a control element provided on said second frame member so as to control the pivoting movement of said at least one pivotable element, said first frame member having at least two bearings for said at least one pivotable element, said bearings defining slightly misaligned pivot axes, and said at least one pivotable element including a bracket formed from a length of wire to define shaft portions mounted in said bearings whereby said bracket is elastically deformed so as to produce said spring bias.

2. The apparatus of claim 1 wherein said frame members are symmetrical with respect to a central plane extending in said reciprocation direction and orthogonal to said display window and wherein said bracket is mounted in two bearings disposed symmetrically with respect to said plane.

3. The apparatus of claim 1 wherein said bracket has crank portions between said two bearings.

4. The apparatus of claim 1 wherein said bracket has crank portions outside of said at least two bearings.

5. The apparatus of claim 1 wherein said bracket is bent to assume a non-biased shape including shaft portions, said bearings being misaligned with said non-biased shaft portions, and said bracket being elastically deformed by mounting said shaft portions in said bearings.

6. The apparatus of claim 5 wherein said non-biased shaft portions define, with a plane extending orthogonal to said reciprocation direction, respectively angles "$\beta$" and "$-\beta$" while said bearings have axes defining respectively with the same plane angles "$-\beta$" and "$\beta$".

7. The apparatus of claim 6 wherein said bracket is mounted in its non-biased shape in said bearings but pivoted about 180° relative to its operational position and is deformed by a pivoting motion into its operational position.

8. The apparatus of claim 7 including blocking means for limiting a bracket deflection due to spring bias.

9. The apparatus of claim 5 wherein said bracket prior to its being mounted includes a bow-shaped central portion connecting said crank portions, said central portion being substantially straightened upon mounting of the bracket.

10. The apparatus of claim 6 modified such that the angles defined by said shaft portions deviate from the values $\beta$ and $-\beta$, respectively, so as to provide an increased or decreased spring bias.

11. The apparatus of claim 1 including a pressure system in said first frame member urging an inserted sheet stack, with the frame members in their inner end position, toward said display window.

12. The apparatus of claim 11 wherein said second frame member comprises longitudinal ledges separated by an aperture and joined by a separator bar, said pressure system being controlled by said separator bar, and said transfer system being controlled by said ledges.

13. The apparatus of claim 11 wherein said pressure system and said transfer system are alternatingly activated and deactivated in response to relative frame member reciprocation.

14. The apparatus of claim 13 wherein said pressure system comprises spring-biased rails extending substantially in direction of said reciprocation, and wherein said transfer system is accommodated in a space unoccupied by said rails.

15. The apparatus of claim 14 wherein said first frame member has bearings for said pivotable element adjacent said rails and opposite said stack of sheets.

16. The apparatus of claim 14 including two symmetrically disposed rails.

17. The apparatus of claim 16 wherein said pivotable element engages said individual sheet at least between said two rails.

18. The apparatus of claim 16 or 17 wherein said pivotable element engages said individual sheet bilaterally outside of said two rails.

19. The apparatus of claim 1 including two pivotable elements disposed in series in said reciprocation direction.

20. The apparatus of claim 1 including stops to be engaged by a transverse edge of said individual sheet.

21. The apparatus of claim 1 wherein said pivotable element comprises a length of wire bent to assume a meander-like shape.

22. An apparatus for cyclic rearrangement of a stack of substantially rectangular sheets of nominally identical thickness, comprising a first frame member and a second frame member, one of said frame members having a display window, said frame members being reciprocable relative to one another between an inner end position and an outer end position, and means for removing an individual sheet from a first end of an inserted sheet stack through a removal gap upon withdrawal of said frame members and for returning said removed individual sheet to the second stack end through a return gap upon the frame members being pushed together, said means including at least one transfer system for guiding said individual sheet from said removal gap to said return gap, said transfer system comprising at least one pivotable element mounted in said first frame member and engaging said individual sheet at its side facing away from said return gap, said pivotable element being subjected to spring bias and pivotable about an axis extending substantially transverse to the reciprocation direction, said transfer system further comprising a control element provided on said second frame member so as to control the pivoting movement of said at least one pivotable element, said at least one pivotable element including at least one control lever arm and said control element including shock-absorbing means for softly engaging with said control lever arm so as to pivot said pivotable element against its spring bias, and to equalize resistance between the sliding elements.

23. The apparatus of claim 22 wherein said second frame member has an inner end wall defining said removal gap, said shock-absorbing means including spring arms which extend beneath said end wall.

24. The apparatus of claim 23 wherein said spring arms form a secondary transfer systems.

25. The apparatus of claim 24 wherein said spring arms engage said individual sheet over a substantial portion of a frame member return stroke.

26. The apparatus of claim 23 wherein free ends of said spring arms are bent towards said return gap.

27. The apparatus of claim 23 wherein said pivotable element has two control lever arms adjacent its outer ends, and each of said control lever arms being adapted to collide with an allocated spring arm.

28. The apparatus of claim 23 wherein each spring arm is adapted to hit, with its free end, an allocated control lever arm adjacent a free end thereof.

29. The apparatus of claim 28 wherein at least a section of each spring arm extends parallel to its allocated control lever arm.

30. The apparatus of claim 23 wherein each spring arm performs a rolling motion along its allocated control lever arm.

31. The apparatus of claim 23 wherein the spring arms include leaf springs.

32. The apparatus of claim 31 wherein said leaf springs have rounded free ends.

33. The apparatus of claim 32 wherein said free ends are folded back on themselves.

34. The apparatus of claim 23 wherein said spring arms, in said inner end position, engage a rear wall of said first frame member.

35. The apparatus of claim 22 wherein said first frame member has at least two bearings for said at least one pivotable element, said bearings defining slightly misaligned pivot axes, and said at least one pivotable element including a bracket formed from a length of wire to define shaft portions mounted in said bearings whereby said bracket is elastically deformed so as to produce said spring bias.

36. The apparatus of claim 35 wherein all spring components are made from metal, and the remaining components are made of plastic material.

37. The apparatus of claim 36 wherein said bearings are injection molded to exhibit slot shape and are closed by plastic deformation.

38. The apparatus of claim 22 wherein said shock-absorbing means include resilient arms.

39. The apparatus of claim 22 wherein said pivotable element has a lever arm length exceeding the distance which spaces its bearings from a sheet support against which said individual sheet is urged by said pivotable element.

40. The apparatus of claim 39 wherein said sheet support includes ribs extending parallel to said frame member reciprocation direction.

* * * * *